INVENTOR.
OSKAR HEIL

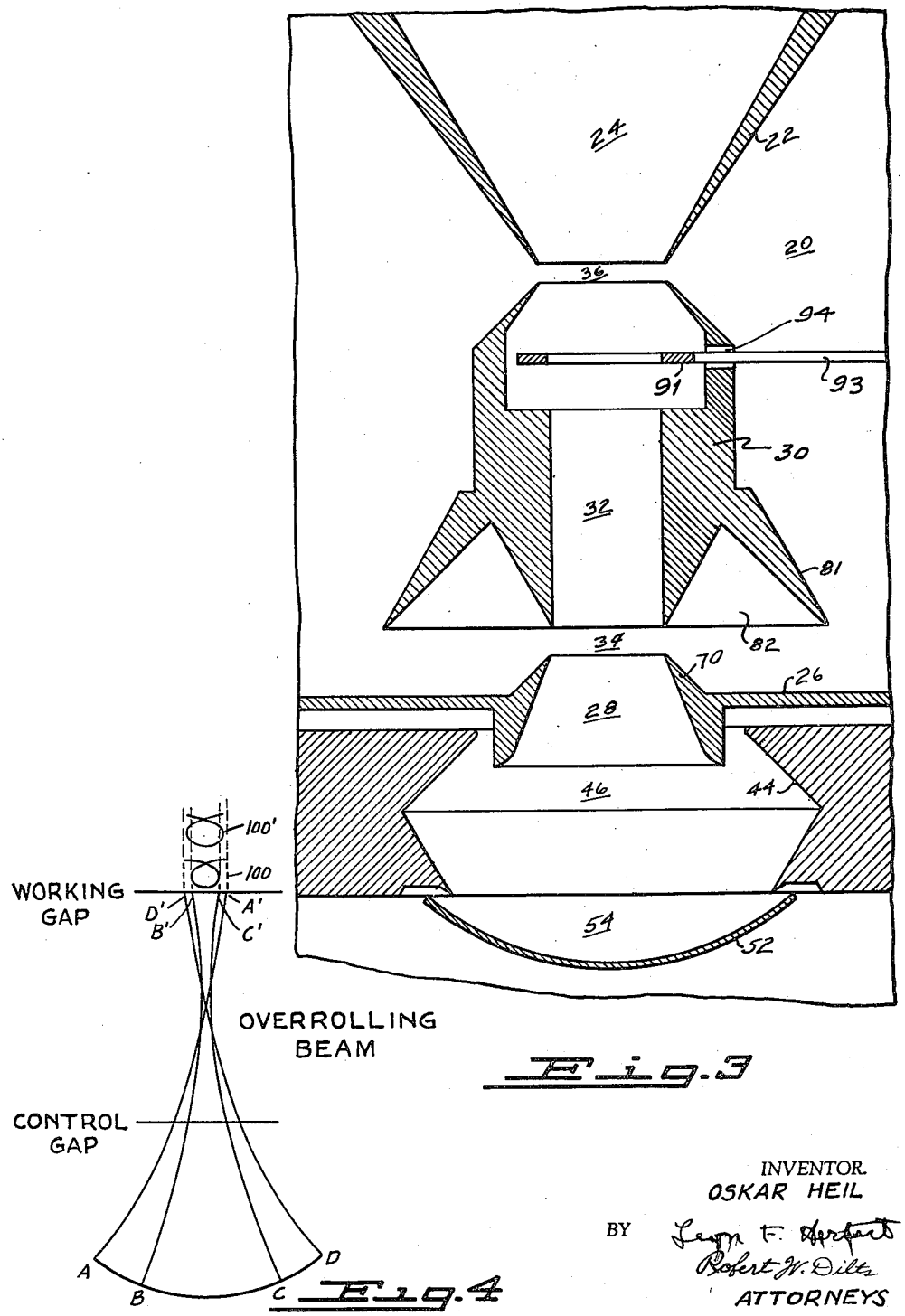

INVENTOR.
OSKAR HEIL

United States Patent Office 3,116,435
Patented Dec. 31, 1963

3,116,435
VELOCITY MODULATION TUBE
Oskar Heil, San Mateo, Calif., assignor to Eitel-McCullough, Inc., San Bruno, Calif., a corporation of California
Filed July 28, 1959, Ser. No. 830,088
20 Claims. (Cl. 315—5.51)

This invention relates to velocity modulated tubes and particularly to klystrons adapted to operate with reduced or without magnetic beam guidance.

Velocity modulation tubes such as klystrons and traveling wave tubes have been found to be well suited to the generation and amplification of extremely high frequencies. However, according to the prior art such devices have required the use of auxiliary magnetic circuits to provide guidance for the electron beam as it passes through the device. Such magnetic circuits comprise permanent magnets or magnetic coils which are bulky and heavy, and in the case of magnetic coils, require bulky and heavy power supplies to energize the coils. Furthermore, magnetic shielding is required, which adds still more bulk and weight. Therefore, velocity modulation tubes according to the prior art along with their associated magnetic circuitry are not suitable for many applications including mobile and airborne applications.

A notable exception to the above rule with respect to velocity modulation tubes is the reflex klystron which is capable of operating at extremely high frequencies without the aid of magnetic circuitry. However, reflex klystrons are inherently inefficient devices, and the amount of power which can be obtained from a reflex klystron is limited, as a practical matter, by such inefficiencies.

It is an object of this invention to provide an improved velocity modulation tube in which its associated circuitry has small bulk and weight.

It is another object of this invention to provide an improved velocity modulation device capable of operating efficiently with reduced magnetic beam guidance requirements.

It is a further object of this invention to provide an improved velocity modulation device capable of operating efficiently at high power in the higher frequency ranges.

In the operation of a velocity modulation tube one of the most difficult problems is presented by the spreading of the beam as it proceeds from the gun to the collector. Even assuming that the electron gun is properly designed to produce a well defined beam, such beam will tend to spread due to various phenomena which will be discussed hereinafter. The spreading of the beam results in reduced efficiency of operation due to the impingement of the beam upon portions of the tube between the gun and collector. Furthermore, the impingement of the beam upon portions of the tube intermediate the gun collector tends to produce secondary electrons which introduce noise and instability in the operation of the tube. In fact, the results of beam spreading may be so detrimental as to render the tube inoperable and thus beam spreading is a limiting factor in the design of the tube.

It is another object of this invention to reduce beam spreading without resorting to magnetic means.

It is a still further object of the subject invention to provide an improved velocity modulation tube having increased operational stability.

Briefly, the above objects are accomplished according to this invention by specific placement of the interaction gaps with respect to each other and with respect to the electron gun and by specific design of the drift tube sections and electron gun, all in accordance with the teaching which will be more fully set forth hereinafter. The invention possesses other objects and features of advantage, some of which with the foregoing will be set forth in the following description of the invention. It is to be understood that the invention is not limited to the embodiments disclosed, as variant embodiments may be adopted within the scope of the claims.

Referring to the drawings:

FIGURE 3 is a fragmentary cross-sectional view of the electronically active portion of an electron tube according to still another embodiment of this invention;

FIGURE 4 is a graphical representation of the electron beam formed in accordance with this invention;

Figure 1:
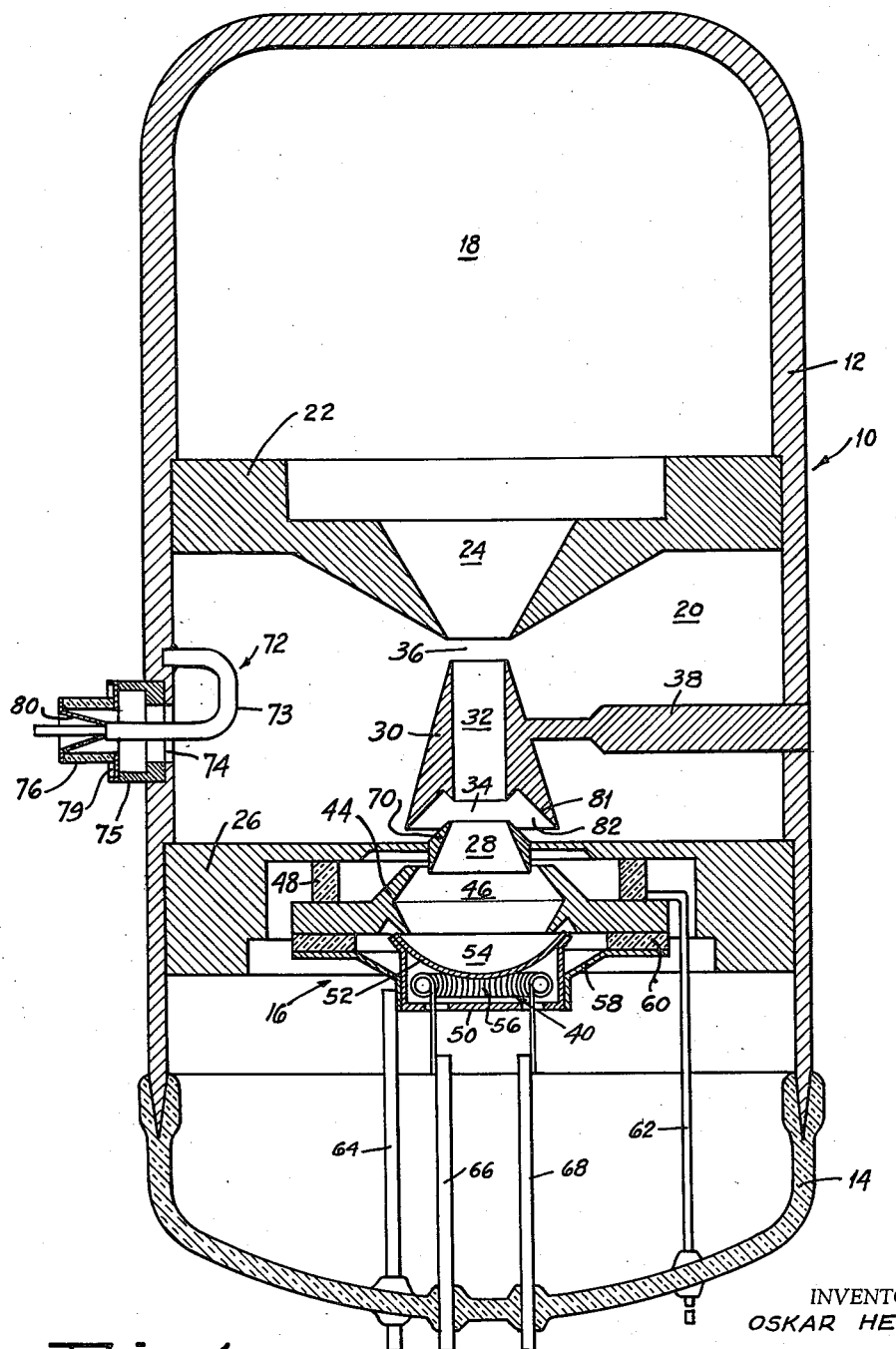
FIGURE 1 is a cross-section view of an electron tube according to one embodiment of this invention.

Referring to FIGURE 1, one embodiment 10 of this invention is shown. According to this embodiment 10 the evacuated envelope structure comprises a cylindrical cup-shaped metal shell 12 and a glass stem 14 closing the open end of the cup-shaped shell 12. An electron gun indicated generally at 16 is mounted adjacent the glass stem 14. The inner volume of the cup-like shell 12 is divided into two compartments 18 and 20, one of which serves to collect the electron beam from the gun 16 and the other of which serves as a resonant cavity through which the beam passes. The collector compartment 18 is provided by a first metallic partition 22 brazed within the cup-like metallic shell 12 perpendicularly to the axis thereof and adjacent to its closed end. A passageway 24 through the partition 22 and coaxial with the axis of the cup-like shell 12 provides for the entrance of electrons into the collector compartment 18. It will be seen that the volume of the collector compartment 18 is large in comparison to the size of the passageway 24 opening into it. This arrangement has been called a "fly-trap" collector and tends to prevent the escape of secondary electrons produced by the impingement of the beam on the inner surface of compartment 18.

A second metallic partition 26 brazed into the metallic shell 12 perpendicularly to the axis thereof and spaced from the first partition 22 provides the second compartment 20 within the shell, which serves as a resonant cavity. An aperture 28 through the second partition 26 coaxial with the shell and with the passageway 24 in the first partition 22 provides for the passage of electrons from the gun 16 through the resonant cavity 20 into the collector 18.

A metallic drift tube 30 having a generally cylindrical inner bore 32 is positioned within the resonant cavity 20 in spaced relation to the partitions 22 and 26 and coaxial with the shell 12 so that it surrounds the electron beam during the passage of the beam through the cavity 20. The spacing between the ends of the drift tube 30 and the partitions 22 and 26 provides interaction gaps 34 and 36. The drift tube 30 may be supported, for example, by one or more metallic rods 38 extending radially from the drift tube 30 and having one end brazed to the wall of the shell 12.

The electron gun 16 comprises a cathode-heater assembly 40 and a focusing electrode 44. The focusing electrode 44 is interposed between the cathode-heater assembly 40 and the partition 26 and comprises a metallic member having an aperture 46 which is coaxial with respect to the aperture 28, and includes first and second truncated conical shell portions having their small bases adjacent the cathode and partition 26, respectively, as shown, with the edge of the shell portion adjacent the cathode extending past or overlapping the peripheral edge of the cathode. The focusing electrode 44 is insulatingly mounted on the partition 26 by means including an insulating ring 48.

The cathode-heater assembly 40 comprises a metallic cup-shaped housing 50. A cathode disk 52 is mounted in the open end of cup-shaped housing 50 and is dished to provide a concave surface 54 facing and coaxial with the focus electrode 44. A coating of thermally emissive material is applied to the concave surface 54. A bifilar helical heater coil 56 is contained within the housing 50 in close proximity to the cathode disk 52. The heater coil 56 is provided with an insulating coating to prevent short circuiting of the heater voltage and opposite ends of the coil project through holes in the heater housing. The cathode-heater assembly 40 is insulatingly mounted on the focusing electrode 44 by means including the flange 58 and the insulating ring 60.

A terminal lead 62 is sealed through the glass stem 14 and is electrically connected to the focus electrode 44. Another terminal lead 64 is sealed through the glass stem 14 and is electrically connected to the heater housing 50 and thus to the cathode disk 52. Two further terminal leads 66 and 68 are sealed through the glass stem 14 and are electrically connected to the opposite ends of the heater coil 56.

In operation, the metallic shell 12 may be grounded, thus placing the metallic partitions 22 and 26 and the drift tube 30 at ground potential. A negative potential is applied to the cathode 52 with respect to ground.

Thus, the apertured metallic partition 26 serves an anode for the electron gun 16. For this purpose a tubular insert 70 is placed in the aperture 28 of the partition 26 in order to provide the proper geometric configuration for shaping the electron beam.

A negative potential is applied to the focus electrode 44 with respect to ground. The negative potential applied to the focus electrode 44 may be somewhat less than that applied to the cathode 52, as will be discussed more fully hereinafter.

When the heater coil 56 is energized it will heat the cathode 52, causing the thermally emissive surface 54 thereof to emit electrons. Due to the concavity of the emissive surface, the geometrical configuration of the focus electrode 44 and of the anode insert 70 which is provided with a tapered bore, as shown, converging toward the drift tube, and the voltages applied thereto, the emitted electrons will be formed into a beam which will pass through the drift tube 30 and into the collector 18.

When the beam crosses the first interaction gap 34 between the drift tube 30 and the anode insert 70 in the aperture 28 of the metallic partition 26, it will tend to be velocity modulated thereby. Thus, the first interaction gap 34 may be called the control gap.

As is well known in the klystron art, such velocity modulation will result in bunching of the electron beam as it proceeds through the drift tube 30 toward the collector 18, the accelerated electrons tending to catch up with the decelerated electrons.

The bunches thus formed will tend to induce electric fields at the second interaction gap 36 in passing thereacross, which electric fields will excite the resonant cavity 20. Thus the second gap 36 may be called the working gap.

When the tube is first placed into operation, spurious density changes in the electron beam will tend to excite the resonant cavity 20 slightly, producing R.F. oscillations therein at its resonant frequency. The oscillations thus induced will tend to cause an R.F. voltage swing across the control gap 34 which will result in velocity modulation of the electron beam as it crosses the control gap. Such velocity modulation will result in bunching of the electron beam, and such bunches will induce a voltage swing across the working gap 36 as they pass thereacross, reinforcing the oscillations within the resonant cavity 20 and producing still greater modulation of the electron beam at the control gap 34. Thus, it will be seen that the device shown in FIGURE 1 will function as a klystron oscillator operating at a frequency determined by the resonant frequency of the cavity 20.

Power may be coupled from the device by means of a coupling loop 72, for example. Coupling loops are well known in the art and comprise a conductor 73 bent into a generally U-shape and having one end electrically connected to the inner surface of a resonant cavity 20, the other end passing out of the cavity through an aperture 74 in the wall thereof. An insulating seal is provided between the conductor and the sides of the aperture to preserve the vacuum-tight envelope. For example, a tubular metallic insert 75 is brazed in the aperture 74 in the embodiment shown in FIGURE 1. A ceramic cylinder 76 coaxial with the aperture 74 is sealed to the tubular metallic insert 75 by means of an annular flange 79 thereon extending across the end of the ceramic cylinder. The free end of the conductor 73 passes coaxially through the insert 75 and ceramic cylinder 76. The end of the cylinder 76 is closed by a metallic end wall 80 which is sealed to the end of the cylinder and has an aperture therein through which the conductor 73 extends. The conductor 73 is brazed vacuum-tight to the aperture in the end wall 80.

A coaxial transmission line may be connected to the device 10, the outer conductor thereof being attached to the metallic insert 75 and the inner conductor thereof being connected to the extending end of the conductor 73.

The support rod 38 for the drift tube 30 is of small diameter and may be located within the cavity 20 in such a position that the current flow induced in such support rod 38 by the oscillations in the cavity 20 are reduced to a minimum. The position of the support rod 38 within the cavity is not very critical in view of the fact that it has a large value of inherent inductance at the operating frequency of the device which tends to prevent the flow of high frequency current therethrough. Therefore, it will be seen that the support rod 38 can be made to be effectively nonexistent with respect to the electro-magnetic fields within the cavity 20.

At this point it must be emphasized that, although all of the embodiments of the subject invention shown are klystron oscillators, appropriate features of such embodiments might also be used in klystron amplifiers. The embodiments shown are oscillators since both the working gap and the control gap are exposed to the same cavity. In order for a device to be an amplifier, the working gap must be exposed to a different cavity from the cavity to which the control gap is exposed. For example, referring to FIGURE 1, an amplifier could be produced by substituting a solid diaphragm for the supporting post 38, thus providing a separation of the control gap cavity from the working gap cavity. The features of the subject invention of the embodiments shown which might also be applied to amplifier klystrons will be more apparent after the following description:

Referring to the klystron oscillator embodiment shown in FIGURE 1, it will be seen that since the interaction gaps 34 and 36 share a common cavity, the voltage swing across each gap will be exactly in phase with respect to the voltage swing across the other gap. However, the gaps may be spaced from each other in order to obtain any desired phase relationship between the voltage on the first gap and the voltage on the second gap, or working gap, with respect to a given electron. In other words, the voltage swing to which a given electron is subjected upon crossing the working gap will be out of phase with respect to the voltage swing to which such electron was subjected upon crossing the control gap by an amount equal to the time required for the electron to pass from the first gap to the second gap. If the time required for the given electron to pass from the control gap to the working gap is equal to the time required for one whole cycle of the operating frequency, then of course the voltages will again be in phase. However, under such conditions the electron would be subjected to exactly the same actions as it was subjected to in the control gap, and thus no energy would be coupled from the electrons into the cavity. Instead, the second gap would only act to further bunch the beam.

In order to obtain maximum coupling from the bunches of electrons in the beam at the working gap, it is well known that the voltage on the working gap should be three-quarters of a cycle out of phase with respect to the bunches when the bunches pass thereacross. Thus, the bunches will be subjected to the maximum decelerating voltage. Therefore, the time required for an electron to pass from the control gap 34 to the working gap 36 is made to correspond to the time required for any whole number of cycles plus three-quarters of a cycle of the operating frequency.

However, according to the preferred embodiment as shown in FIGURE 1, the working gap is spaced a distance from the control gap such that an electron traveling at average beam velocity will pass from the control gap to the working gap in the time required for oscillations in the resonant cavity to pass through one and three-quarters cycles, or in other words, seven-quarters cycles of the operating frequency. This length has been determined by a number of things, including, for example, the desired beam voltage and the beam perveance at which the device is to be operated. Then in a device in which the electrons take seven-quarters cycles to pass from the control gap to the working gap the voltage at the control gap should be less than the voltage at the working gap. The proper R.F. voltage division between the working gap and the control gap for oscillation or amplification is obtained by making the ratio of the working gap capacitance to the control gap capacitance less than one. Since the capacitance of a gap is inversely proportional to the gap spacing, a smaller spacing provides a larger capacitance. Therefore, a common method of maintaining the capacitance ratio less than one between the working gap and control gap is to make the control gap spacing much smaller than the working gap spacing. Thus, the R.F. voltage developed across the control gap by the oscillations within the cavity will be smaller than the R.F. voltage developed across the working gap by such oscillations.

However, in a klystron oscillator as shown in FIGURE 1 the drift tube is subject to vibrations. Such vibrations will tend to increase the spacing at one of the gaps and decrease the spacing at the other. However, if the control gap spacing is smaller than the working gap spacing the vibration will produce a greater change in capacitance at the control gap than at the working gap, resulting in a net change in total capacitance in the cavity. The net change in total capacitance in the cavity will result in a change in the operating frequency of the device. In other words, since the reciprocal of the total cavity capacitance is equal to the sum of the reciprocals of the control gap and working gap capacitance, a given movement of the drift tube will result in a change in the operating frequency.

Referring to FIGURE 1, this problem has been overcome by providing a conically tapered skirt 81 on the end portion of the drift tube 30 adjacent the control gap 34, the skirt extending across the control gap and surrounding the end portion of the anode insert 70. In other words, instead of making the control gap spacing smaller than the working gap spacing, in order to make the capacitance of the control gap greater than the capacitance of the working gap, the drift tube 30 is effectively made of larger outer diameter adjacent the control gap 34 than adjacent the working gap 36, by means of the conically tapered skirt. The effect of such increased diameter adjacent the control gap is to increase the capacitance at such control gap without decreasing the control gap spacing. This enables the control gap spacing and the working gap spacing to be the same. Thus, vibration of the drift tube 30 will not change the total capacitance of the cavity since the capacitance at the control gap will tend to vary at the same rate as the capacitance at the working gap due to their equal gap spacing.

A further refinement shown in FIGURE 1 is the provision of an annular depression 82 having conically tapered side walls convergent in a direction away from the anode 70, and formed in the drift tube 30 adjacent the control gap 34. The purpose of such conical depression is to reduce the possibility of electron multipactoring due to the multiplication of beam electrons impinging on the edges of the control gap 34. Furthermore, the skirt 81 on the drift tube 30, by extending across the gap, provides a shield about the control gap which prevents the escape of beam electrons from the control gap into the cavity 20 to produce spurious resonances within such cavity 20. Thus, provision of the skirt 81 on the drift tube 30 adjacent the control gap 34 adds to the stability of operation of the device according to the subject invention.

Figure 2:
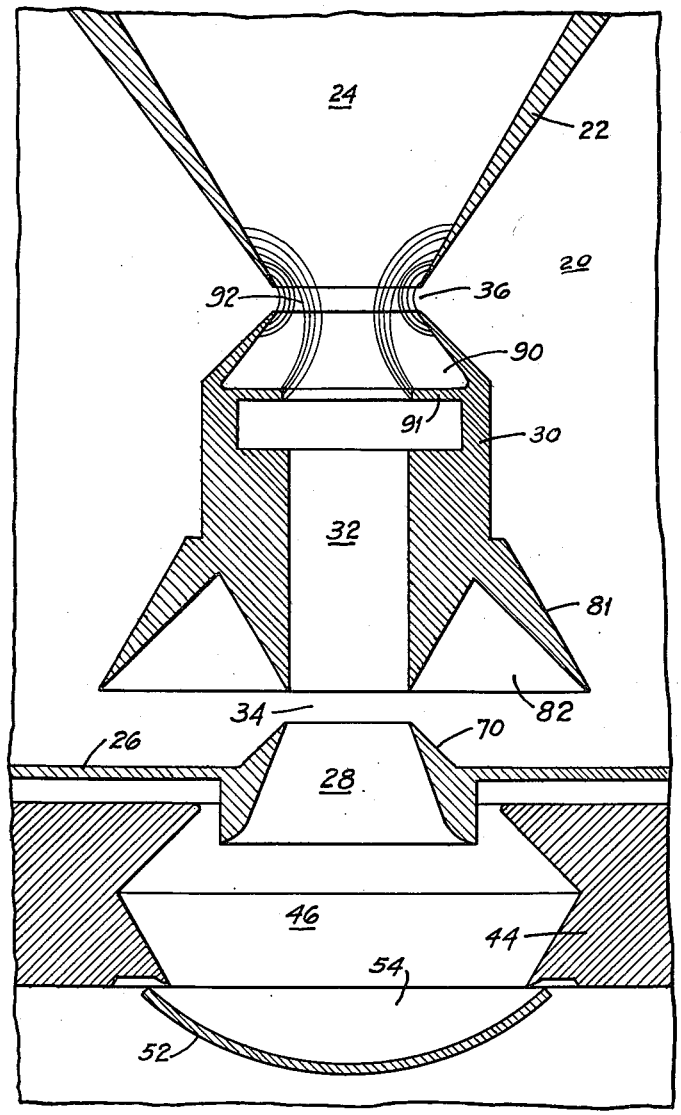
FIGURE 2 is a fragmentary cross-sectional view of the electronically active portion of an electron tube according to still another embodiment of this invention.

Referring to FIGURE 2, an embodiment of this invention is shown which includes means for avoiding the spreading of the electron beam as it passes through the drift tube 30. According to this embodiment of the invention, the inner bore 32 of the drift tube 30 is provided with an enlarged diameter adjacent the working gap 36 so that the inner wall of the drift tube is farther away from the tube axis. Such portion 90 of enlarged diameter enables the inclusion of a field concentrating means 91 within the drift tube. It is shown that the electric field produced by the R.F. voltage across an interaction gap will tend to extend into the field free space which is provided by the drift tube 30. This electric field decreases rapidly along the axial length of the drift tube. However, at a distance from the interaction gap equal to the distance which an electron will travel in the time required for one-half cycle of the frequency oscillations, the R.F. field within the drift tube is still several percent of its value at the interaction gap. According to the embodiment shown in FIGURE 2, such electrostatic field concentrating means takes the form of a radically extending metallic ring 91 integral about its outer periphery with the drift tube so that it assumes the drift tube potential. The ring 91 is disposed within the enlarged portion 90 of the drift tube 30 at an axial distance from the working gap 36 equal to the distance an electron will travel during one half cycle of the operating frequency. Field lines 92, which tend to penetrate the drift tube, will tend to terminate on such metallic ring 91, because electrostatic field lines tend to concentrate on the sharpest edge on the shortest path, thus producing a concentrated electrostatic field adjacent the sharp edge of the metallic ring 91. Now, since the working gap 36 extracts energy from the beam, the electron bunches will pass through the working gap when the electrostatic field at the working gap is opposing the travel of the bunches. However, the bunches pass through the ring 91 a half cycle ahead of the time when the bunches pass through the working gap. At this time the field lines 92 are reversed in direction from the direction of the electrostatic field lines at the working gap when the bunches pass therethrough. Since the electrostatic field concentrated at the ring 91 has a substantial value, the bunches as they pass through ring 91 will be accelerated and radially focused to a much larger extent than they would be focused in a plain ended conventional drift tube 30. Thus it is seen that the bunches are prevented from spreading before they enter the working gap 36, thus increasing the efficiency of the klystron.

Referring to FIGURE 3, a still further embodiment of the subject invention is shown. According to this embodiment, the same concept is involved as in the embodiment shown in FIGURE 2. However, according to the embodiment shown in FIGURE 3, different means are provided for increasing the electrostatic field concentration at the place where ring 91 (FIGURE 2) was placed. Such means comprises a lead 93 extending through an aperture 94 in the side wall of drift tube 30 and electrically connecting a metallic ring 91, which is insulated from the drift tube 30, to an external source of voltage (not shown). For example, the lead might terminate on the walls of the cavity in such a position as to extract energy from the cavity and conduct it into the ring, which is in proper phase relationship with the passage of bunches of electrons past the ring. This energy will tend to strengthen the field lines between the ring and the collector side of the working gap, thus increasing the focusing action of the ring 91 on the bunches as they pass through such ring. One difficulty with the embodiment shown in FIGURE 3 is the capacitance introduced by the passage of the lead through the drift tube 30. Such capacitance makes the design of a circuit which will supply alternating frequency energy to the ring 91 extremely difficult. However, a negative D.C. potential with respect to ground on ring 91 will tend to focus the bunches before they enter the working gap.

It has been found that the electrons in a device according to the embodiment shown in FIGURE 2 will actually be focused more when the tube is oscillating than when the beam is passing through the tube and no oscillations occur. Thus, the effectiveness of the field concentrating means in focusing the beam is clearly apparent.

Referring to FIGURE 4, a still further concept which results in focusing of the electron beam is shown. According to this concept, the electron gun is caused to produce an overfocused beam or, as it has been termed, an over-rolling beam. In the usual klystron, the gun is adapted to produce a beam of given focus. In other words, the beam is caused to approach a minimum diameter at a given point and then diverge. The divergence of the beam is caused by several factors. One factor is the mutual repulsion of the electrons of the beam for each other. Thus, according to the prior art the electron beam emerges from the gun and converges to approach a minimum diameter at the control gap and then the beam begins to spread. Obviously, to ensure a focused beam at the working gap one would think that the gun and working gaps and control gaps could be so arranged that the beam would be converging in the control gap and would approach its smallest diameter in the working gap. However, this is undesirable because the control gap introduces radial defocusing of the beam. The radial defocusing of the beam introduced by the control gap has been found to vary directly with the diameter of the beam at the control gap. In other words, the larger the diameter of the beam at the control gap, the greater would be the radial spreading of the beam due to the action of such control gap. Therefore, if the beam is made to converge in the control gap to a diameter consistent with formation of a minimum diameter in the working gap, the radial defocusing by the control gap on the relatively large diameter beam will be so pronounced as to cause actual spreading of the beam in the working gap, or, in other words, the radial defocusing of the control gap overcomes the converging action of the gun. Also, if the gun is so adapted that the focal point is produced in the control gap, then the beam will obviously tend to spread due to space charge repulsion of the electrons in the beam, again producing spreading of the beam in the working gap. In the past a compromise solution was found to be the best possible arrangement. According to such compromise solution, the point of minimum diameter of the beam, or in other words, the focal point of the beam, is placed half-way between the control gap and the working gap. Thus, the dispersing effect of the control gap is less than when the beam is focused in the working gap, resulting in less spreading of the beam in the working gap. However, this compromise can be still further improved according to the subject invention.

According to this invention an over-rolling beam is used which has its minimum diameter also at a point half-way between the control gap and the working gap. In an over-rolling beam, the electrons from the outer boundaries of the cathode are made to actually cross the center line of the beam (over-roll) and appear on the opposite side of the beam from the side of the cathode whence they came. In other words, the electron from Point A on the cathode in FIGURE 4 would cross the working gap at A′, from point B at B′, from point C at C′, and from point D at D′. The electrons emitted along a part B—C of the diameter will remain on their respective sides of the axis. The electrons emitted along the diameter near points A and D will over-roll the beam axis. The loop 100 illustrates how the electrons on one diameter A—D will cross the working gap. Actually, the loop formed by the over-rolling electrons is in only one dimension but for clarity of explanation is illustrated in two-dimension to show the sweep of all electrons that are emitted along the cathode diameter A—D. This loop repeats itself for all the infinite number of diameters of the cathode. Now, when the tube is oscillating and the beam passes the control gap, the beam is radially defocused by the action of the control gap. But now the electrons emitted on the diameter near points A and D will be drawn toward the axis (thus decreasing the outer diameter of the beam) and the electrons emitted on the part B—C of the diameter will be repelled away from the axis (therefore increasing the inner diameter of the loop 100 and pulling the ends of the loop inwardly toward the axis of the beam as shown by illustration 100′). This combined over-rolling and control gap effect has the tendency to concentrate the electrons close to the periphery of the beam and to increase the interaction of the beam with the working gap.

The technical explanation of the advantage of the over-rolling beam may be compared to the principle of optics by which it is known that focusing may be obtained by directional dispersion of a beam. In other words, directional uniformity may be sacrificed in order to obtain a closer packed beam. It will be seen that at the focal point of an electron beam, according to the subject invention, the direction of the individual electrons varies widely, some of such electrons actually crossing the beam and others of such electrons passing substantially parallel to the axis of the beam. Thus, the circle of least confusion which forms the focal point may be made of much smaller diameter and in addition the dispersing effect of the control gap will be converted to a converging effect at the working gap as previously described.

Figure 5:
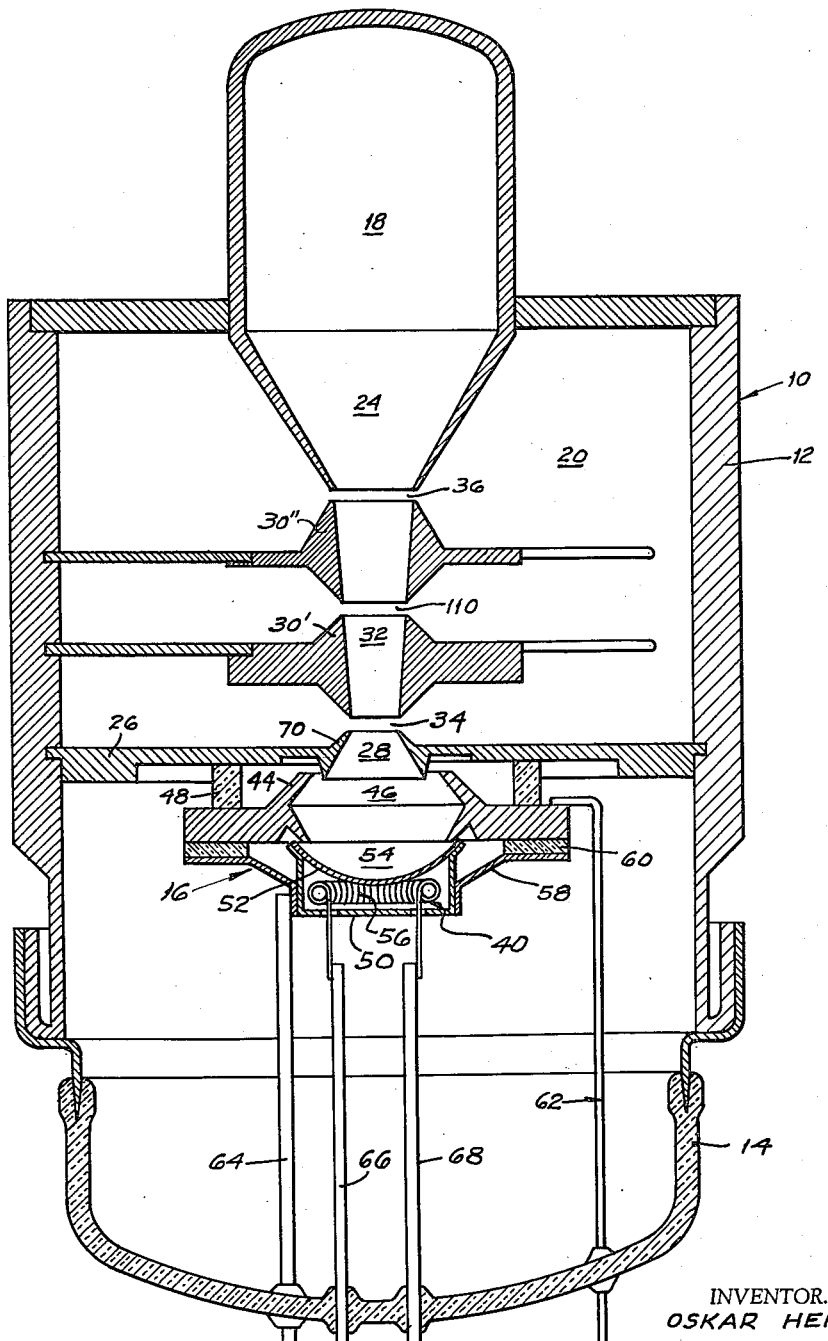
FIGURE 5 is a cross-sectional view of an electron tube according to yet another embodiment of this invention.

Referring to FIGURE 5, a further embodiment of the subject invention is shown wherein the drift tube 30 is divided into two sections, 30′ and 30″ thus providing an intermediate gap 110 between the control gap and the working gap. Otherwise the electron tube shown in FIGURE 5 is substantially identical to that shown in FIGURE 1 and like numbers represent like items. The distance between the control gap 34 and the working gap 36 is still seven-quarters of a cycle of the operational frequency. The intermediate gap 110 is placed exactly half-way between the control gap and working gap, or in other words, seven-eighths of a cycle of the operating frequency. It has been found that at this position the intermediate gap may be caused to perform three functions. In the first place, it tends to extract power from the modulated beam, thus adding to the oscillations within the cavity 20. Furthermore, it tends to increase the bunching action of the beam. And finally, it tends to radially focus the beam. Thus, the intermediate interaction gap 110 is caused to add small increments of desirable effect to the beam. If the interaction gap 110 is moved either closer to the control gap 34 or further from it, it will tend to increase one or more of the above described actions at the expense of one or more of the other of such actions. Therefore, it will be seen that the location of the intermediate gap half-way between the working gap and the control gap represents the best compromise to produce the most advantageous results from such intermediate gap.

Figure 6:
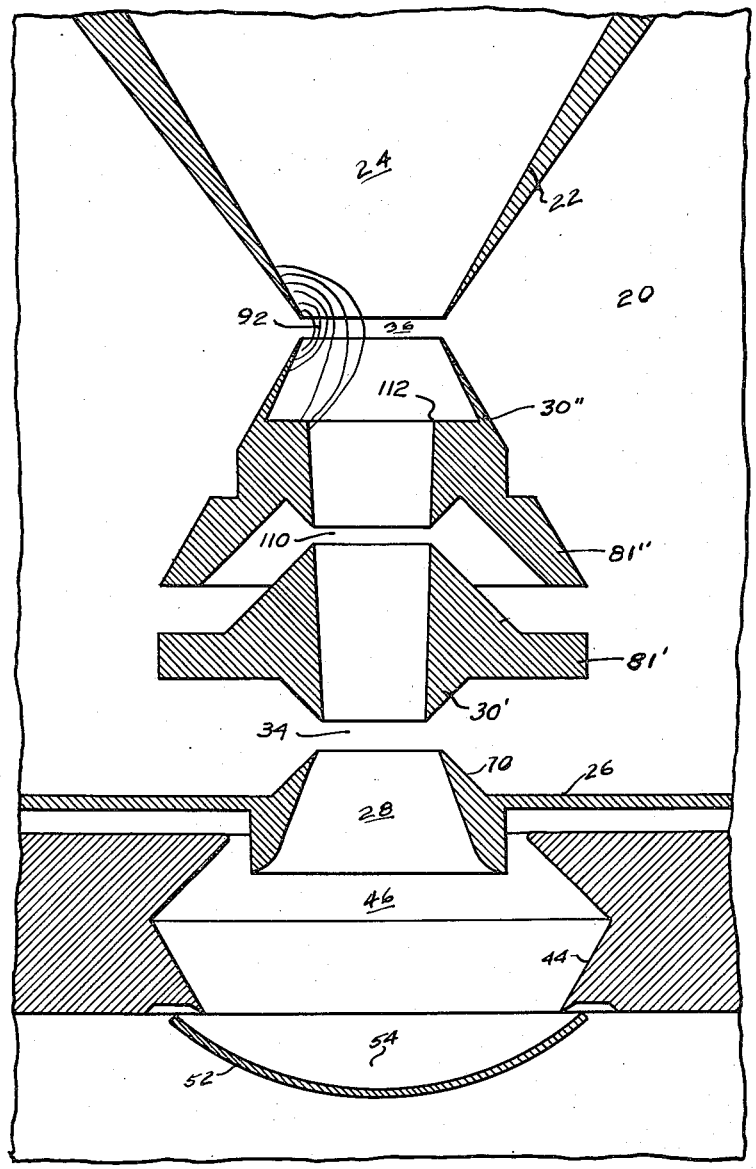
FIGURE 6 is a fragmentary cross-sectional view of the electronically active portion of an electron tube according to a still further embodiment of this invention.

Referring to FIGURE 6, another embodiment of the device shown in FIGURE 5 is shown, and like numbers represent like items. According to this embodiment a double drift tube oscillator is provided which incorporates features heretofore described with respect to FIGURES 1 and 2. In the first place, the first drift tube section 30' and second drift tube section 30" are provided with skirts 81' and 81" whereby the capacitance across the intermediate gap may be adjusted with respect to the capacitance across the working gap. In addition, the skirt 81' on the first drift tube section 30' is used to adjust the voltage across the control gap with respect to the voltage across the other two gaps. These skirts operate in the same way as was described with respect to FIGURES 1 and 2. Furthermore, the second drift tube section 30" is provided with an enlarged conical shape bore adjacent the working gap. Such enlarged diameter enables the concentration of field at the internal corner 112 thereof, thus producing the focusing effect described in connection with FIGURES 2 and 3. It will be seen that the same structure could not be used as was shown in FIGURE 2, since the field penetrating the second drift tube section from the intermediate gap 110 would also tend to be concentrated on the ring 91. This field would tend to act contrarily to the field from the working gap and would probably counteract the effect of concentration of the penetrating field of the working gap. Thus, the only field concentrating means provided according to FIGURE 6 is the corner 112 formed at the junction of the enlarged conical shape bore with the smaller bore so that the R.F. field penetrating from the intermediate gap sees a continuous surface, whereas the R. F. field penerating the drift tube section from the working gap sees a sharp corner 112 as the shortest distance and the electrostatic field is concentrated there.

It will be seen that the concepts above described with respect to the embodiments shown may be applied to conventional klystrons as well as to the klystron oscillator shown and described. Therefore, the scope of the claims should not be interpreted so as to limit the application of the concepts therein defined to klystron oscillators. The mere replacement of the supporting means for the drift tube sections by solid disks forms separate cavities changing the device to an amplifying klystron. Of course, it would be necessary to drive the input cavity adjacent the control gap in order to obtain amplification of the oscillations in the output cavity adjacent the working gap. However, this would not change any of the concepts of the subject invention except perhaps those relating to the spacing of the interaction gaps with respect to each other since it will be seen that the phase relationship of the various cavities would not necessarily be identical.

Therefore, it will be seen that an improved klystron structure is provided wherein certain design features are taken advantage of, enabling the klystron to operate without the aid of auxiliary magnetic circuits. In fact, such design features are so effective in preventing spreading of the electron beam that the beam is actually focused while the tube is oscillating or in operation and less focused when the tube is not in operation. This is entirely contrary to the operation of klystrons according to the prior art wherein the modulation of the electron beam to provide bunching thereof actually produced defocusing of the beam.

A device according to the subject invention is particularly adapted for mobile uses such as in airborne equipment due to its light weight and small bulk and also due to the fact that no auxiliary magnetic circuits or shielding are required. It is believed that an electron tube according to the subject invention will be superior to even reflex klystrons in this respect due to its higher efficiency which has been found to be in the neighborhood of twenty percent as compared to the one or two percent efficiency of reflex klystrons. It is believed that those skilled in the art will find many new and useful applications for an electron tube constructed according to the teachings of the subject invention.

I claim:

1. A velocity modulated tube comprising an electron gun for generating a beam of electrons along an axis, a collector electrode for receiving said beam of electrons, a cavity resonator having two coaxial apertures on opposite sides thereof, a drift tube section interposed coaxially between said electron gun and said collector electrode forming a control gap adjacent said electron gun with one of said apertures of said cavity resonator and forming a working gap adjacent said collector electrode with the other of said apertures of said cavity resonator, said drift tube section having a portion of a given inner diameter and a portion of a larger inner diameter, said portion of large inner diameter being located at the end of said drift tube section adjacent said working gap, and metallic means formed in said portion of larger diameter for concentrating the electrostatic field therein at a position spaced from said end of said drift tube section.

2. A velocity modulated tube as set forth in claim 1 wherein said metallic means for concentrating the electrosatic field is spaced at a distance from said end of said drift tube such that an electron at a given tube operating voltage will travel from said means to said working gap in the time required for one half cycle of the operating frequency of tube.

3. A velocity modulated tube including an evacuated envelope and comprising an electron gun for generating an over-rolling convergent electron beam along an axis and which focuses to a minimum diameter on said axis, a collector electrode forming a part of the evacuated envelope for receiving said beam of electrons, a cavity resonator having two coaxial apertures on opposite sides thereof, and a drift tube section interposed coaxially between said electron gun and said collector electrode forming a control gap adjacent said electron gun with one of said apertures of said cavity resonator and forming a working gap adjacent said collector electrode with the other of said apertures of said cavity resonator, said electron gun including a concave cathode, focus electrode and accelerating anode operatively related to place the minimum diameter of said over-rolling electron beam between said control gap and said working gap.

4. A velocity modulating tube comprising an electron gun generating an over-rolling electron beam along an axis which beam focuses to a minimum diameter on said axis, a collector electrode for receiving said electron beam, a cavity resonator having two coaxial apertures on opposite sides thereof, a drift tube section interposed coaxially between said electron gun and said collector electrode forming a control gap adjacent said electron gun with one of said apertures of said cavity resonator and forming a working gap adjacent said collector electrode with the other of said apertures of said cavity resonator, said minimum diameter of said over-rolling electron beam being disposed between said control gap and said working gap, said drift tube section being formed in two parts and forming an intermediate interaction gap between said two parts, said intermediate interaction gap being spaced from said control gap the distance an electron at a given tube operating voltage will travel in the time required for the operating frequency of said tube to complete seven-eights of a cycle, skirt means disposed on the ends of said drift tube section for adjusting the capacitance of said control gap and the capacitance of said intermediate gap in relation to each other and also to the capacitance of said working gap, said drift tube section having a portion of a given inner diameter and another portion of a larger inner diameter, said portion of larger inner diameter being located at the end of said drift tube section adjacent said working gap, metallic means in said portion of larger diameter for concentrating the electrostatic field therein at a position spaced from the end of said drift tube section adjacent said working gap, said means being spaced at a distance from said working gap so that an electron at said tube operating voltage will travel from said means to said working gap in the time required for one-half cycle at the operating frequency of said tube.

5. A velocity modulated tube comprising an evacuated envelope arranged about a longitudinal axis and including integral collector, resonator and beam generating portions, a first apertured partition extending across said envelope transversely of said axis to separate the integral collector portion from the resonator portion, a second apertured partition extending across said envelope parallel to said first partition to separate said resonator portion from said beam generating portion, an electron gun within said beam generating portion rigidly mounted on said second apertured partition for generating and projecting a beam of electrons through the apertures of said first and second partitions and into the collector portion, drift tube means supported on the envelope within the resonator portion spaced between said first and second partitions to provide working and control gaps of equal width in said resonator portion for interaction with the beam of electrons, and an accelerating anode having a tapered bore therethrough converging in the direction of the drift tube means and supported on the second partition and cooperating with said gun to focus said beam of electrons on said axis intermediate the control and working gaps.

6. The combination according to claim 5, in which said gun includes a dish-shaped cathode and a hollow focusing electrode rigidly supported in electrically insulating relation to each other and to said second partition, said focusing electrode including axially aligned first and second truncated conical shell portions having their small bases adjacent the cathode and said second partition, respectively.

7. In an electron tube having an evacuated envelope, a cathode having a concave emitting surface, an accelerating anode operatively associated with the cathode, and a beam forming electrode operatively interposed between the anode and cathode and comprising a hollow shell portion one end of which overlaps a peripheral edge portion of the concave cathode on the side thereof adjacent the emitting surface of the cathode.

8. The combination according to claim 7, in which said shell includes first and second truncated conical portions the smaller bases of which define opposite ends of the shell.

9. The combination according to claim 7, in which the other end of the shell includes a truncated conical portion the apex end of which lies radially spaced about said accelerating anode.

10. In a velocity modulated beam tube including an electron gun and a collector, a drift tube section axially interposed between said electron gun and collector, said drift tube having a control gap and a working gap therein, one end of the drift tube section being shaped to provide a plurality of divergent intercepting surfaces angularly disposed in relation to the axis of the drift tube.

11. The combination according to claim 10, in which said drift tube section is formed in two axially spaced parts defining an intermediate interaction gap therebetween.

12. The combination according to claim 10, in which said tube includes a cavity resonator having axially aligned apertures in opposite walls thereof, and said drift tube section is interposed between said electron gun and collector in axial alignment with said apertures to define a control gap adjacent the electron gun and a working gap adjacent the collector.

13. The combination according to claim 11, in which the end of one of said drift tube parts adjacent the intermediate interaction gap is shaped to provide a plurality of divergent intercepting surfaces angularly disposed in relation to the axis of the drift tube.

14. The method of operating a charged particle velocity modulated tube having at least two spaced areas of interaction therein, comprising the steps of energizing said tube to project a beam of over-rolling charged particles successively past said areas of interaction, focusing said beam of charged particles to a minimum diameter at a point between said spaced areas of interaction, exposing the beam at one of said areas of interaction to an oscillating force of predetermined frequency to velocity modulate charged particles in the beam, shielding the velocity modulated particles for an interval between said areas of interaction to density modulate the beam, and extracting energy oscillations at said other area of interaction.

15. The method according to claim 14, in which said tube is an electron tube, said beam of charged particles is an electron beam, and said energy oscillations extracted at said other area of interaction are electromagnetic oscillations.

16. The method according to claim 15, in which said density modulated beam is exposed to a concentrated focusing electrostatic field before said density modulated beam passes through said other area of interaction.

17. The method according to claim 15, in which said two spaced areas of interaction constitute first and last areas of interaction, a third area of interaction is provided intermediate said first and last areas, shielding the velocity modulated electrons for an interval between said first and intermediate interaction areas to partially density modulate the beam, exposing said partially density modulated beam at said intermediate interaction area to said oscillating force of predetermined frequency to further velocity modulate the electrons of the beam, and exposing said partially density modulated beam at said intermediate area of interaction to an eletcrostatic field when the magntiude of said oscillating force thereacross is approximately seven-tenths the magnitude of the oscillating force thereacross at its maximum.

18. The method according to claim 15, in which said two spaced areas of interaction constitute first and last areas of interaction, the magnitude of the oscillating force to which the beam is exposed attaining a maximum value in said first interaction area, a third area of interaction is provided intermediate said first and last areas of interaction, shielding the velocity modulated electrons for an interval between said first and intermediate areas of interaction to partially density modulate the beam, exposing said partially density modulated beam at said intermediate interaction area to an oscillating force having a magnitude approximately seven-tenths the magnitude of said oscillating force at its maximum value, and exposing said density modulated beam to a concentrated focusing electrostatic field before said density modulated beam passes through said last area of interaction.

19. The method according to claim 17, in which said density modulated beam is exposed to a concentrated focusing electrostatic field before said density modulated beam passes through said last area of interaction.

20. In a velocity modulated beam tube including an electron gun and a collector, a drift tube section axially interposed between the electron gun and collector, said drift tube section being formed in two axially spaced parts having a control gap and a working gap and an intermediate interaction gap therebetween, one end of the drift tube section being shaped to provide a plurality of divergent intercepting surfaces angularly disposed in relation to the axis of the drift tube, said intermediate interaction gap being spaced from the control gap an amount corresponding to the distance an electron at a given tube operating voltage will travel in the time required for the operating frequency of the tube to complete seven-eights of a cycle.

References Cited in the file of this patent

UNITED STATES PATENTS

| | | |
|---|---|---|
| 2,411,535 | Fremlin | Nov. 26, 1946 |
| 2,422,695 | McRae | June 24, 1947 |
| 2,455,269 | Pierce | Nov. 30, 1948 |
| 2,466,064 | Wathen et al. | Apr. 5, 1949 |
| 2,487,800 | Hansen | Nov. 15, 1949 |
| 2,508,316 | Verburg et al. | May 16, 1950 |
| 2,621,304 | Altovsky et al. | Dec. 9, 1952 |
| 2,659,024 | Bernier et al. | Nov. 10, 1953 |
| 2,679,613 | Garbuny | May 25, 1954 |
| 2,720,611 | Sloan | Oct. 11, 1955 |
| 2,777,969 | Svensson | Jan. 15, 1957 |
| 2,807,746 | Gardner et al. | Sept. 24, 1957 |
| 2,817,033 | Brewer | Dec. 17, 1957 |